United States Patent
Deeg et al.

(10) Patent No.: US 12,188,487 B2
(45) Date of Patent: Jan. 7, 2025

(54) DRIVE UNIT HAVING A COOLING UNIT

(71) Applicant: Innomotics GmbH, Nuremberg (DE)

(72) Inventors: Christian Deeg, Altdorf (DE); Harald Kuhn, Nuremberg (DE); Mischa Maidorn, Stein (DE); Stefan Mächtel, Hemhofen-Zeckern (DE); Hans Tischmacher, Lauf (DE)

(73) Assignee: Innomotics GmbH, Nuremberg (DE)

( * ) Notice: Subject to any disclaimer, the term of this patent is extended or adjusted under 35 U.S.C. 154(b) by 370 days.

(21) Appl. No.: 17/600,908

(22) PCT Filed: Mar. 5, 2020

(86) PCT No.: PCT/EP2020/055863
§ 371 (c)(1),
(2) Date: Oct. 1, 2021

(87) PCT Pub. No.: WO2020/200630
PCT Pub. Date: Oct. 8, 2020

(65) Prior Publication Data
US 2022/0163052 A1    May 26, 2022

(30) Foreign Application Priority Data
Apr. 4, 2019 (EP) .................................. 19167304

(51) Int. Cl.
*F04D 29/58* (2006.01)
*F04D 19/00* (2006.01)
(Continued)

(52) U.S. Cl.
CPC ....... *F04D 29/5806* (2013.01); *F04D 19/002* (2013.01); *F04D 25/06* (2013.01);
(Continued)

(58) Field of Classification Search
CPC .... F04D 29/5806; F04D 29/58; F04D 19/002; F04D 19/00; F04D 25/06; F04D 29/5853;
(Continued)

(56) References Cited

U.S. PATENT DOCUMENTS

| 5,049,769 A | 9/1991 | Reinhardt et al. |
| 6,270,320 B1 | 8/2001 | Heyder et al. |

(Continued)

FOREIGN PATENT DOCUMENTS

| CN | 2495058 Y | 6/2002 |
| CN | 102954037 A | 3/2013 |

(Continued)

OTHER PUBLICATIONS

English translation of DE 10 2012 206 199 A1 (Year: 2013).*
(Continued)

*Primary Examiner* — Tulsidas C Patel
*Assistant Examiner* — Joshua Kiel M Rodriguez
(74) *Attorney, Agent, or Firm* — Henry M. Eelereisen LLC (57) ABSTRACT

A drive includes a dynamoelectric rotational machine, an electronic add-on part, and a fan unit arranged axially behind one another. The fan unit generates a cooling air flow and is embodied as a two-zone fan having axial fan elements which define a first zone to generate essentially an axial air flow and include an articulated joint with an elastic region with sufficient restoring force, and radial fan blades which define a second zone that radially adjoins the first zone and generate essentially a radial air flow. Free spaces are provided at least between a housing arrangement and the fan unit and/or between the housing arrangement and a bearing shield of the dynamoelectric rotational machine and/or between the housing arrangement and/or a shaft of the dynamoelectric rotational machine, with the free spaces (Continued)

being acted upon during operation of the fan unit by the cooling air flow and a Venturi effect.

5 Claims, 5 Drawing Sheets

(51) Int. Cl.
*F04D 25/06* (2006.01)
*H02K 5/18* (2006.01)
*H02K 9/06* (2006.01)

(52) U.S. Cl.
CPC ........... *F04D 29/5853* (2013.01); *H02K 5/18* (2013.01); *H02K 9/06* (2013.01)

(58) Field of Classification Search
CPC .......... F04D 29/582; H02K 5/18; H02K 9/06; H02K 9/14; H02K 11/33
See application file for complete search history.

(56) References Cited

U.S. PATENT DOCUMENTS

| 2008/0030087 | A1 | 2/2008 | De Filippis et al. | |
| 2009/0039741 | A1* | 2/2009 | Heining | H02K 11/33 |
| | | | | 310/68 D |
| 2013/0039766 | A1 | 2/2013 | Murikipudi et al. | |
| 2015/0042213 | A1 | 2/2015 | Bradfield | |
| 2015/0130386 | A1 | 5/2015 | Benson et al. | |
| 2016/0006325 | A1 | 1/2016 | Grabner | |
| 2018/0106259 | A1 | 4/2018 | Lin | |
| 2019/0060957 | A1 | 2/2019 | Burukin et al. | |
| 2019/0368502 | A1* | 12/2019 | Rakuff | H02K 9/06 |

FOREIGN PATENT DOCUMENTS

| DE | 38 42 588 | A1 | 6/1990 | | |
| DE | 198 12 729 | A1 | 9/1999 | | |
| DE | 10 2012 206 199 | A1 | 10/2013 | | |
| EP | 0854560 | A1 | 7/1998 | | |
| EP | 1511157 | A2 | 3/2005 | | |
| EP | 1622243 | A1 | 2/2006 | | |
| EP | 3211761 | A1 | 8/2017 | | |
| FR | 2818705 | A1 | 6/2002 | | |
| JP | S60152247 | A | 8/1985 | | |
| KR | 20040026492 | A | 3/2004 | | |
| KR | 20110097165 | A | * | 8/2011 | ............. F04D 29/36 |

OTHER PUBLICATIONS

English translation of KR-2011-0097165-A (Year: 2011).*
PCT International Search Report and Written Opinion of International Searching Authority mailed Jun. 30, 2020 corresponding to PCT International Application No. PCT/EP2020/055863 filed Mar. 5, 2020.

* cited by examiner

DRIVE UNIT HAVING A COOLING UNIT

CROSS-REFERENCES TO RELATED APPLICATIONS

This application is the U.S. National Stage of International Application No. PCT/EP2020/055863, filed Mar. 5, 2020, which designated the United States and has been published as International Publication No. WO 2020/200630 A1 and which claims the priority of European Patent Application, Ser. No. 19/167,304.5, filed Apr. 4, 2019, pursuant to 35 U.S.C. 119 (a)-(d).

BACKGROUND OF THE INVENTION

The invention relates to a drive unit having a dynamoelectric machine, at least one electronic add-on part and at least one cooling unit.

Drive units of this type are known for example from DE 198 12 729 A1. The invention describes an electric motor, in particular having a fan wheel to form an axial or radial fan, having a drive unit and a control unit that has a controller housing, wherein the drive unit has a stator, a rotor and at least one electric coil and wherein the control unit has an electronic circuit for controlling or regulating the power supply to the coil. The drive unit and the control unit are formed by modules and contact elements that are assigned to one another are provided so as to create the mutual electrical connection.

An arrangement of this type is likewise known from DE 38 42 588 A1. The invention describes a brushless direct current external rotor motor that comprises a stator that is fastened to a motor flange and has stator windings, an external rotor that encompasses the stator on its side that is facing away from the motor flange, and an electronic circuit arrangement that controls the stator windings. This circuit arrangement has a printed circuit board that carries electronic components that are arranged facing the stator on the flange side and multiple power semiconductors that are arranged on the printed circuit board, electrically connected, in heat conducting contact with the motor flange. The power semiconductors are connected indirectly by way of an annular disk-shaped cooling body to the motor flange so as to conduct heat. The cooling body forms a pre-assembled assembly together with the printed circuit board and a carrier element that holds the printed circuit board.

Following on from this, the object of the invention is to provide a compact drive unit that ensures sufficient cooling of the drive unit.

SUMMARY OF THE INVENTION

This object is achieved by a drive having
at least one dynamoelectric rotational machine,
at least one electronic add-on part that is positioned in a closed housing arrangement,
at least one fan unit,
wherein these components are arranged in an axial manner one behind the other, in that the electronic add-on part is arranged in an axial manner between the dynamoelectric rotational machine and the fan unit,
wherein free spaces are provided at least between the housing arrangement and the fan unit and/or between the housing arrangement and the bearing shield of the dynamoelectric rotational machine and/or between the housing arrangement and/or a shaft of the dynamoelectric rotational machine,
wherein during the operation of the fan unit the free spaces can likewise be influenced by a cooling air flow on account of a main flow path (the fan cowl, the surface of the electronic add-on part and the motor housing) and by means of the Venturi effect.

In accordance with the invention, a cooling effect is now provided by way of the main flow path and also by way of these free spaces in which on account of the Venturi effect an air flow is likewise generated that contributes to the cooling of the adjacent drive components. Consequently, heat is prevented from accumulating in these free spaces.

This cooling variant receives support in that the fan unit is embodied as a two-zone fan that is connected in a non-rotating manner to a shaft. Consequently, two air flows that run independently of one another are generated during the operation of the dynamoelectric rotational machine. The drive can thus be embodied in accordance with the invention in an even more compact manner in particular in the axial direction.

The two-zone fan has a first zone in the region in the region of the hub of the fan that generates essentially an axial air flow. Radially adjoining is a second zone on the fan, said second zone generating essentially a radial air flow. This radial air flow generates the main flow path, wherein approximately 80 to 90% of the air that is drawn in flows into the main current path.

The free spaces and/or the components that flank the main flow path have structures that increase the size of the surface area and are oriented essentially parallel to the respect flow paths. These are thus ribs on a bearing shield and the housing arrangement running in particular in a radial manner. Consequently, the cooling efficiency is increased.

Further measures for increasing cooling efficiency are provided by virtue of the fact that a housing that encompasses the dynamoelectric rotational machine has ribs that extend at least in sections on the outer circumference. An additional fan cowl that also serves as a guiding apparatus for the main flow path enhances the Venturi effect in that starting from a BS bearing shield it extends at least over the electronic add-on part and approximately 30% of the axial length of the housing of the dynamoelectric rotational machine.

The electronic add-on part has components that are embodied as actuators or converters.

Consequently, a very compact and high-performance drive is produced, whose components, in particular the electronic add-on parts by way of the housing arrangement and also the dynamoelectric rotational machine, such as the stator and rotor and the free spaces that are provided therebetween, cool.

The housing arrangement is embodied from a comparatively thermally efficient conductive material, such as for example aluminum or aluminum alloys.

The housing arrangement can be embodied in a cylindrical or also funnel-shaped manner, wherein the funnel has a cylindrical section and an axially tapering section that can be embodied as one piece from the same material, from multiple parts of different materials and from multiple parts of the same material.

The housing arrangement has a cut-out through which a shaft protrudes that inter alia forms the drive shaft of the cooling unit, in particular of a fan.

The actuator and converter components can be arranged in particular also exclusively in the cylindrical section of the housing arrangement, in this case the axially tapering section acts as a thermal capacity that has a heat buffering effect. Consequently, sufficient cooling of the drive is also ensured in the case of alternating operating states.

The rotor of the dynamoelectric rotational machine is also cooled inter alia by way of the shaft. Furthermore, heat of the rotor is also discharged to the interior space of the dynamoelectric rotational machine with the result that the bearing shields, bearings and housing can likewise consequently heat up. This heat input from the free spaces is dissipated by the air that is flowing around the housing and the end shields, in particular by the air flow of the Venturi effect.

The stator of the dynamoelectric rotational machine likewise generates heat that inter alia heats up the interior space of the dynamoelectric rotational machine. This heat input is likewise dissipated by the air that is flowing around the housing and the bearing shields. Furthermore, the stator is preferably shrink-fitted into a housing jacket in order to obtain a comparatively efficient heat transfer from the laminated core of the stator to the housing and the housing ribs. The heat is then dissipated from there to the major part of the main air flow.

During the operation of the dynamoelectric rotational machine, the cooling unit that is embodied as an integral fan generates one or multiple cooling air flows, which flows/flow radially and/or axially along at least the surface of the housing arrangement and the free spaces.

BRIEF DESCRIPTION OF THE DRAWING

The invention and further advantageous embodiments of the invention are illustrated in detail with the aid of principle illustrated exemplary embodiments; in the drawings.

DETAILED DESCRIPTION OF PREFERRED EMBODIMENTS

Figure 1:
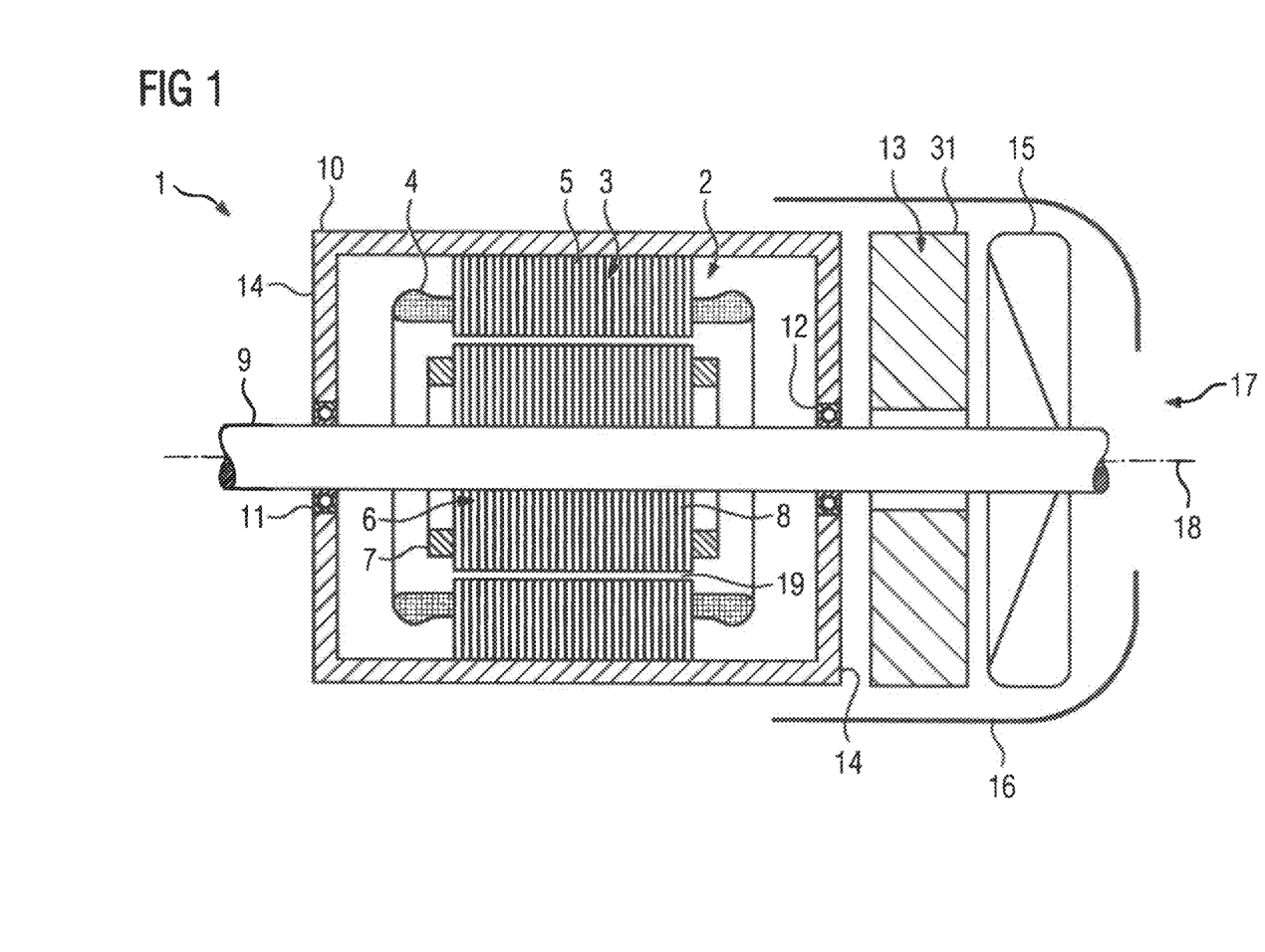
FIG. 1 shows a principle longitudinal sectional view of a drive in accordance with the invention.

FIG. 1 illustrates a drive 1 having a dynamoelectric rotational machine 2 that has a stator 3 having a laminated core 5. A winding system is arranged, facing an air gap 19, in the laminated core 5 of the stator 3, said winding system forming winding heads 4 on the end faces of the laminated core 5 of the stator 3. A laminated core 8 of a rotor 6 is connected in a non-rotating manner to a shaft 9, said laminated core interacting in an electromagnetic manner with an energized winding system of the stator 3 and this leads to a rotation of the shaft 9 about an axis 18.

The shaft 9 is held in a non-rotating manner in two bearings, an AS bearing 11 (that faces the work machine that is to be driven) and a BS bearing 12 (that is facing away from the work machine that is to be driven). The dynamoelectric rotational machine 2 is encompassed by a housing 10 that is delimited at the end faces by bearing shields 14. An electronic add-on part 13 that comprises at least components of a converter or actuator is located spaced apart in an axial manner from the BS side and forming a free space. The electronic add-on part 13 is stationary and not connected to the shaft 9 in a non-rotating manner. The electronic add-on part 13 is connected in a mechanical manner to the BS bearing shield 14 and/or to the housing 10 and is accommodated in a housing arrangement 31. Likewise, the supply lines and/or the sensor lines are laid over the bearing shield and/or the housing 10 while maintaining the respective protection class.

Adjoining thereto in an axial manner is a fan 15, in particular a two-zone fan, which is in turn connected in a non-rotating manner to the shaft 9, and said fan generates cooling air flows that are guided at least in part by a fan cowl 16. The incoming air is supplied to the fan 15 by way of a suction opening 17 of the fan cowl 16.

Figure 2:
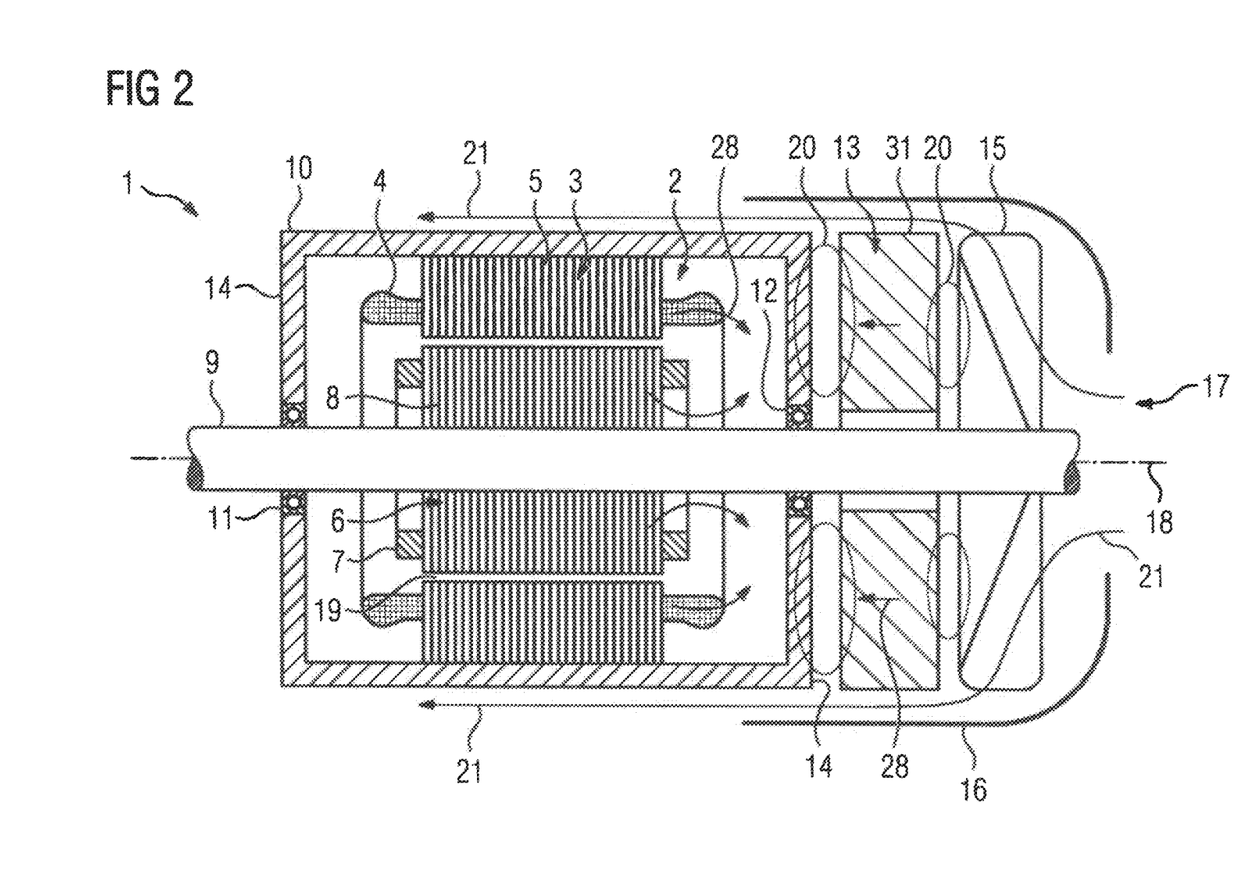
FIG. 2 shows a principle longitudinal sectional view of a drive in accordance with the invention, having regions where accumulated heat can develop.
Figure 4:
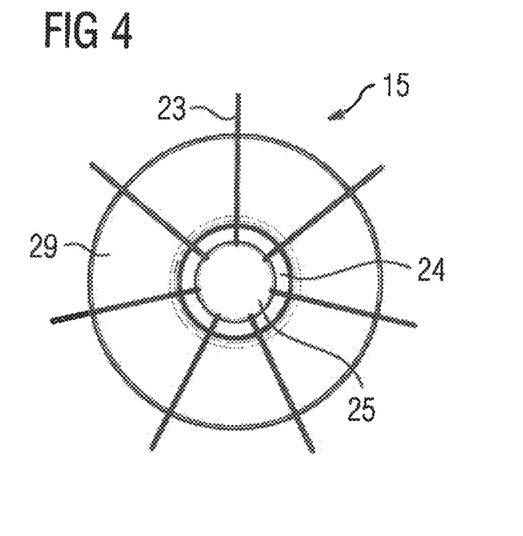
FIG. 4 shows a frontal view of the two-zone fan.

In the case of the drive 1, during the operation of the drive 1 accumulations of heat 20 occur in particular between the electronic add-on part 13 and the facing bearing shield 14, and/or between a cover disk 29 of a fan 15 in accordance with FIG. 4 and the electronic add-on part 13, In other words in the free spaces. In addition to its own heat development, additional heat can thus be Introduced onto the electronic add-on part 13 from both axial sides. Thus, heat losses from the converter or the actuator and also heat from the machine 2 by way of the bearing shield 14 lead to these accumulations of heat 20. The heat from the machine 2 comprises inter alia the heat losses from the stator 3 and the rotor 6. In addition, this heats up the adjacent bearings 11, 12, which has an adverse effect on the lubricating material of the bearing 11, 12, damages the lubricating characteristics and leads to shorter lubrication intervals of the bearings 11, 12.

The heat is also transported by way of the shaft 9, in particular from the rotor 6 of the dynamoelectric rotational machine 2 and supplied to the fan 15 that functions in this case as a heat discharging element. The fan 15—as an integral fan—normally generates a cooling air flow only during the operation of the dynamoelectric rotational machine 2 since the fan 15 and the shaft 9 are coupled in a non-rotating manner.

Figure 3:
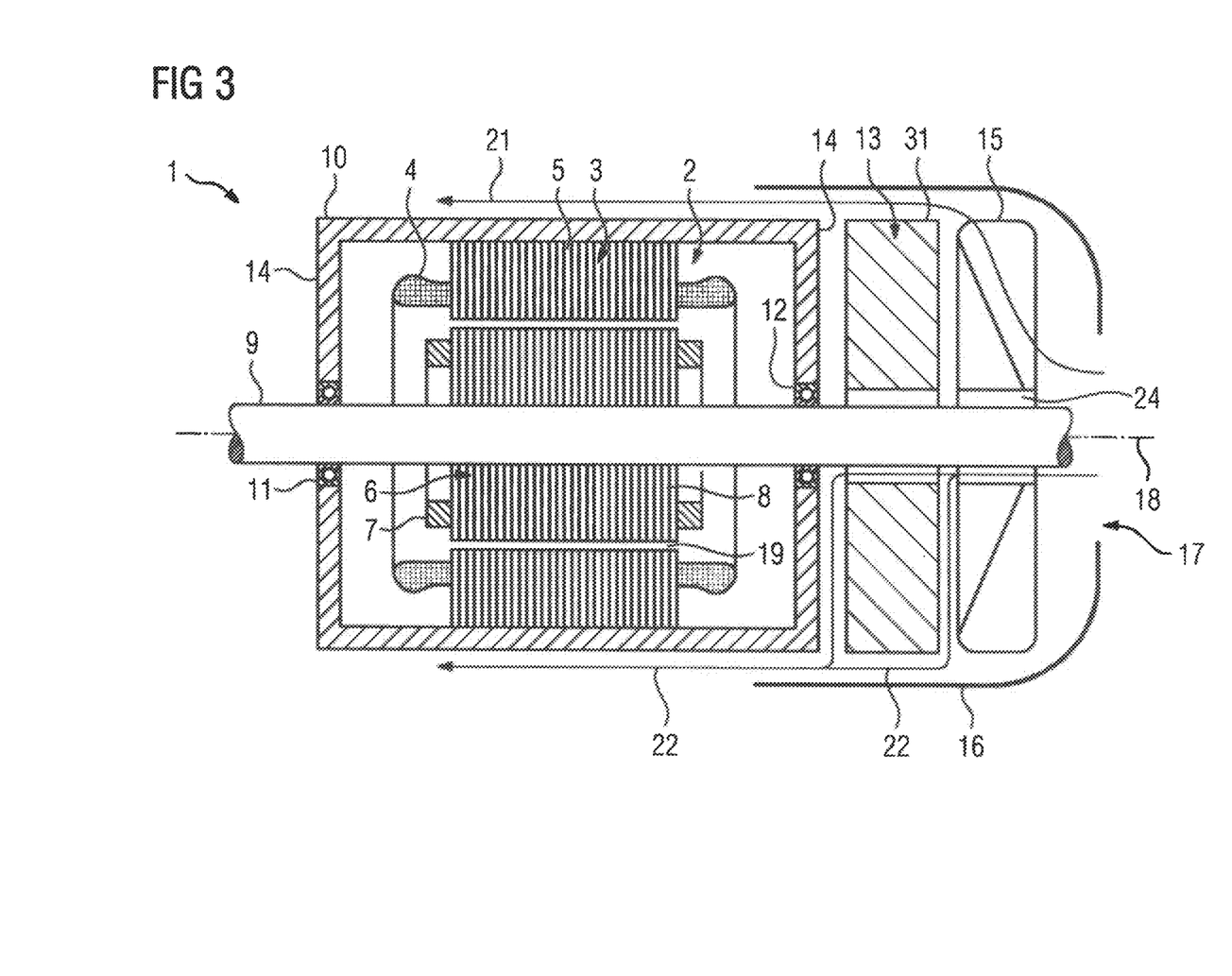
FIG. 3 shows a principle longitudinal sectional view of a drive having cooling air flows.

FIG. 3 now shows, by way of example, the cooling air flows which, through specially provided free spaces or coolant paths, lead, in particular, to reducing the accumulation of heat 20.

In order to explain the progression of the cooling air flows, FIG. 3 illustrates above the axis 18 a main cooling air flow 21 (fan cowl 16, surface of the electronic add-on part 13 and housing 10) and below the axis 18 the cooling air flows 22 that are caused inter alia by the Venturi effect and/or by a first zone of the fan. In reality, these cooling air flows 21, 22 are present at the entire circumference.

Figure 5:
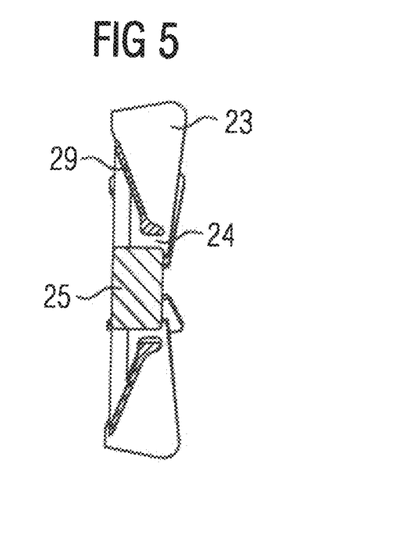
FIG. 5 shows a lateral view of the two-zone fan.

FIG. 4 illustrates in a frontal view a two-zone fan having a hub 25 that is connected to the shaft 9 in a non-rotating manner. Furthermore, fan blades 23 that are arranged with their small side in accordance with FIG. 5 against a disk 29 extend radially arranged starting from the hub 25. A through passage 24 is located arranged around the hub 25.

Figure 6:
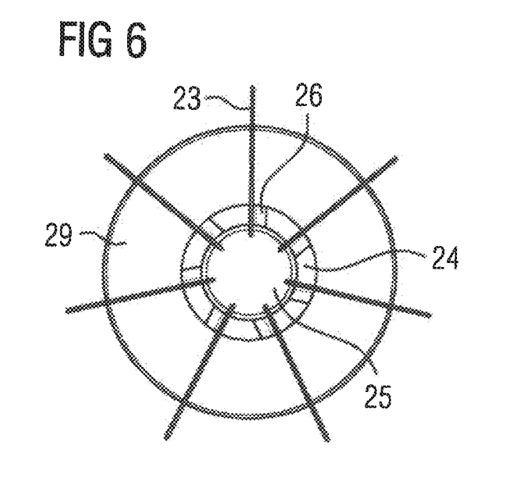
FIG. 6 shows a frontal view of the two-zone fan having fan elements.

FIG. 6 illustrates fan elements 26 that are arranged in the through passage 24 and generate above all an axial air flow that supports the above described Venturi effect.

Figure 7:
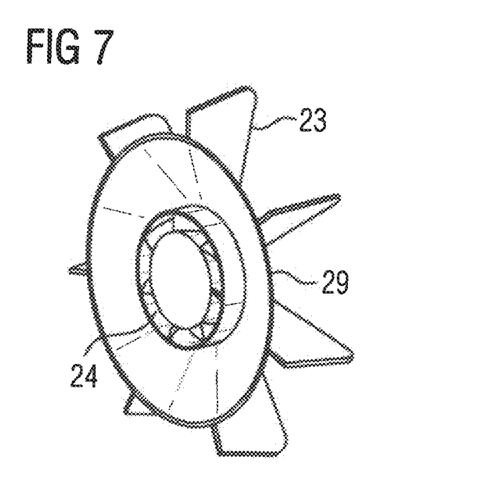
FIG. 7 shows a perspective view of the two-zone fan.

FIG. 7 illustrates the arrangement of the fan elements 26 in a perspective illustration.

Figure 8:
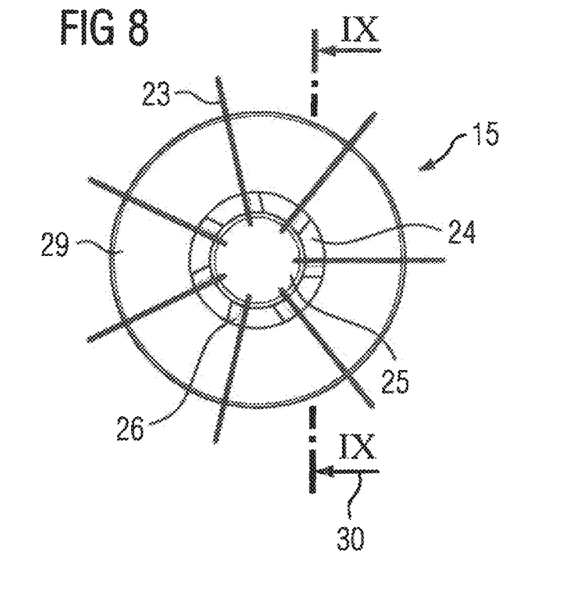
FIG. 8 shows a frontal view of the two-zone fan, with a sectional plane.
Figure 9:
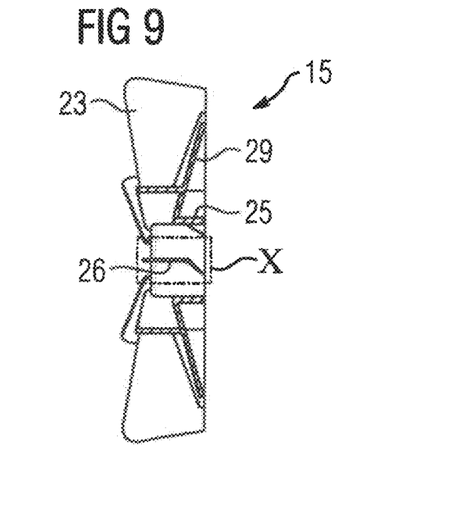
FIG. 9 shows a sectional side view of the two-zone fan.
Figure 10:
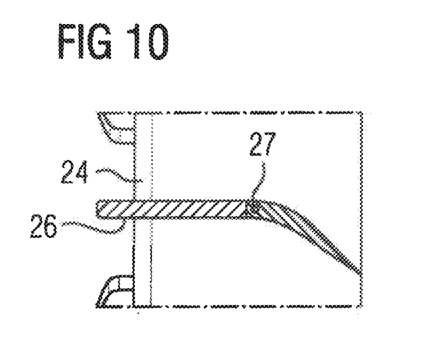
FIG. 10 shows a detailed illustration.

FIG. 8 illustrates the section IX through a two-zone fan, wherein FIG. 9 illustrates this sectional view. Fan elements 26 that comprise an articulated joint 27 in accordance with FIG. 10 are located in the through passage 24. Consequently, the two-zone fan can convey an air flow in an axial manner irrespective of the direction of rotation. The articulated joint 27 has in the elastic region a sufficient restoring force in order to maintain an axial conveyance.

By virtue of using in accordance with the invention the two-zone fan 15, sufficient cooling is also ensured in the free spaces—supported by the Venturi effect. The accumulations of heat 20 are consequently avoided.

In order to realize sufficient cooling of the components of the drive 1 even in the case of a low rotational speed of the dynamoelectric rotational machine 2, the two-zone fan that is coupled to the shaft 9 can also have an external fan.

The inner side of the cylindrical section and/or of the axially tapering section of the housing arrangement 31 is embodied in a polygonal manner in order to be able to arrange the actuator components or converter components of the electronic add-on part 13 directly on the inner side of the housing arrangement 31. Consequently a comparatively thermally efficient connection is ensured.

The actuator components or converter components can be arranged in particular also exclusively in the cylindrical section, in this case the axially tapering section acts as a thermal capacity that has a heat buffering effect. This section is then embodied as a solid material.

The drive 1 or the drive unit is fundamentally constructed in a compact manner. In this case, the features described above and below can be used individually or in any combination to configure the drive 1 and assembled together. In this case, the compact drive 1 is to be cooled inter alia in the best possible manner.

For this purpose, at least one electronic add-on part 13 or components thereof, such as one or multiple power semiconductors, restrictors, capacitors and regulating components are provided in an axial manner on the dynamoelectric rotational machine 2. These components of the electronic add-on part 13 are arranged in a closed housing arrangement 31. The drive 1 and its respective sections/parts are cooled by one or more cooling units and this can be realized in the form of a fluid cooling (cooling jacket on the housing arrangement 31 and/or on the housing 10 of the dynamoelectric rotational machine 2). It is preferred that an air cooling is provided, the fan 15 of which is arranged on the side of the housing arrangement 31 that is facing away from the dynamoelectric rotational machine 2 with the result that an axial sequence of a fan 15, a housing arrangement 31 of the electronic add-on part 13 and a dynamoelectric rotational machine 2 is present.

The fan 15 can also be constructed as a fan unit comprising one or more integral or also external fans that can also be integrated at least in part on or in a fan cowl 16.

In order to improve the cooling effect, measures that enlarge the surface area are provided on the housing arrangement 31 and/or on the housing 10 of the dynamoelectric rotational machine 2. In this case, ribs, knobs or additional thermal capacities are provided thereon in the form of extensions to the housing that can buffer the thermal loads in the case of the corresponding operation of the drive 1.

Furthermore, the special configuration or cut-outs between the dynamoelectric rotational machine 2, in particular its bearing shield 14 and the housing arrangement, produce cooling channels that by virtue of the corresponding configuration and a main air flow create a Venturi effect in the cut-outs which contributes to the cooling.

The housing arrangement 31 can also be embodied in a funnel-shaped manner, wherein the funnel has a cylindrical section and an axially tapering section that can be embodied as one piece from the same material, from multiple parts of different materials and from multiple parts of the same material.

In order to increase the size of the surface area of the housing arrangement 31 of the electronic add-on part 13, the cylindrical section and/or the axially tapering section has on its outer side ribs that extend in an axial or quasi radial manner.

The inner side of the cylindrical section and/or of the axially tapering section of the housing arrangement 31 is embodied in a polygonal manner in order to be able to arrange the actuator components or converter components of the electronic add-on part 13 directly on the inner side of the housing arrangement 31. Consequently a comparatively thermally efficient connection is ensured.

The actuator components or converter components can be arranged in particular also exclusively in the cylindrical section of the housing arrangement 31, in this case the axially tapering section 26 acts as a thermal capacity that has a heat buffering effect. This section 26 is then embodied as a solid material that simultaneously for the fan 15 fulfills the function of a cover disk. Consequently, axially shorter fans 15 can be used in order to obtain a more compact construction of the drive 1.

Likewise, it is possible to provide in the electronic add-on part 13 one or more internal fans that lead to an internal cooling circuit within the closed electronic add-on part 13. In this case, the internal fan can be controlled in dependence upon the temperature either separately to an external fan or can be magnetically coupled to the shaft 9 with the result that a type of internal ventilation of the electronic add-on part 13 is provided as soon as the shaft 9 rotates.

The drive of the internal fan is performed by way of a magnetic coupling of magnets that are positioned on the shaft 9 and magnets that are correspondingly arranged within the electronic add-on part 13 for example on a hub of the internal fan.

Alternatively, the internal fan can also draw its drive energy from the rotational field of the dynamoelectric rotational machine 2, in particular from its harmonics.

The electrical drive energy of the internal fan can also be drawn directly from the actuator components or converter components within the electronic add-on part 13.

The internal fans are in this case rotatably mounted in the case of each embodiment within the stationary add-on part 13.

In this case, the actual temperature is determined in each case by way of a temperature model and/or by one or more temperature sensors in the dynamoelectric rotational machine 2 and/or the electronic add-on part 13.

The two fans 15, 20 render it possible to also maintain at least in part a redundant operation of the drive 1 if one of the two fans 15, 20 should fall.

For regulating purposes, the drive 1 can also have a regulating unit that receives data from a wide variety of sensors inter alia temperature sensors, oscillation sensors, noise sensors. The temperature sensors are arranged in the case of this drive 1 at the relevant installation sites. Thus, temperature sensors are provided for the external air, for the electronic add-on part 13, the power semiconductor in the electronic add-on part 13, for the bearing or bearings 11, 12, for the winding system and/or the winding head 4, for the interior space of the machine 2 and also for the housing 10 and the environment.

Sensors that are provided in the drive 1, therefore in the machine 2 and/or the electronic add-on part 13 are connected by cable or in a cable-free manner to a regulating unit that is arranged in the electronic attachment unit 13 or on the housing 10 of the machine 2, in particular in a terminal box or in the machine 2.

Oscillation sensors are attached to the shaft 9 and/or to the housing 10. Noise sensors are provided above all on noise-emitting sources, such as for example the ribs or bearing shields 14. Furthermore, rotational speed sensors are provided for regulating the drive 1.

Based on all this data, the regulating unit regulates or controls inter alia the rotational speed of the external fan or external fans and/or the clock frequency of the converter. In other words, in the case of particularly high external temperatures and/or a low rotational speed of the shaft 9, the external fan is switched on in dependence upon the temperature. In this case, the rotational speed and consequently the volume flow of the external fan 26 can also be controlled or regulated.

The actual temperature preferably of the entire drive 1 is measured by way of one or more of the above mentioned temperature sensors. In addition, it is possible by way of a temperature model to verify the measured values or by way of predetermined algorithms that are stored in the regulating unit and/or on a cloud (for example by way of a digital twin) to determine temperatures of the drive components that do not have sensors.

Consequently, an energy-efficient operation of the drive 1 can be performed and furthermore it is possible to better plan maintenance intervals of the drive 1 and its components, such as for example re-lubrication intervals of the bearings.

The sensors are in this case oscillation sensors, temperature sensors, moisture sensors etc. Advantageously, the sensors transmit their data to the regulating unit in a wired manner or by way of wireless connections. The data is either recorded by direct contact or optically (for example infra-red temperature measurement).

The regulating units of different drives 1 can also be in contact by way of a cloud and in this case can exchange predeterminable data of their drives.

Consequently, a very compact and high-performance drive 1 is produced that on account of the regulating unit ensures a thermally and/or energy efficient operation of the drive 1. In this case, the regulating unit intervenes in the clock frequency, the degree of modulation and/or the control angle of a converter of the electronic add-on part, as well as, for example, in the rotational speed of an external fan. Consequently, with respect to thermal limits and/or energy efficiency of the drive 1, an optimum and manageable distribution of loss between the components of the dynamoelectric rotational machine 2 and the electronic add-on part 13 is produced. By means of the cooling units, at least one base cooling unit, an integral fan 15 and/or a booster cooling unit that cools in particular the components of the dynamoelectric rotational machine 2, such as the stator and rotor, and also the electronic add-on parts 13, such as the power electronic system and control electronic system, regulating unit etc., a thermally controllable or regulatable optimum operation of the drive 1 is ensured.

For example, specific adjustments of the clock frequency of the converter lead to smaller losses in the converter but increase the losses in the dynamoelectric rotational machine 2. Conversely, thermally advantageous adjustments for the dynamoelectric rotational machine 2 place greater thermal loads on the converter. Depending upon which of these part systems of the drive 1 still has thermal reserves, it is possible to adjust the converter accordingly by way of the regulating unit. In addition, the regulating unit can also intervene in the cooling in that for example one or more external fans of the drive 1 are switched on or off or are operated at an appropriate rotational speed.

The invention claimed is:

1. A drive, comprising:
a dynamoelectric rotational machine including a motor housing, a shaft and a bearing shield;
a closed housing arrangement;
an electronic add-on part positioned in the closed housing arrangement; and
a fan unit including a fan cowl to guide a cooling air flow generated by the fan unit over a surface of the electronic add-on part and the motor housing, said fan unit embodied as a two-zone fan which includes a hub which is connected to the shaft in a non-rotating manner, axial fan elements configured to include an articulated joint with an elastic region with sufficient restoring force in order to maintain an air flow in an axial manner irrespective of a direction of rotation and which are completely arranged in a through passage of the hub to define a first zone to generate essentially an axial air flow, and radial fan blades which radially extend from the hub and are arranged with their small side against a disk to define a second zone that adjoins the first zone in a radial manner and which generate essentially a radial air flow,
wherein the dynamoelectric rotational machine, the electronic add-on part and the fan unit are arranged axially behind one another, with the electronic add-on part being arranged axially between the dynamoelectric rotational machine and the fan unit, and
wherein free spaces are provided at least between the housing arrangement and the fan unit and/or between the housing arrangement and the bearing shield of the dynamoelectric rotational machine and/or between the housing arrangement and the shaft of the dynamoelectric rotational machine, with the free spaces being influenced during operation of the fan unit by the cooling air flow and a Venturi effect.

2. The drive of claim 1, wherein the free spaces and/or at least one of the dynamoelectric rotational machine, the electronic add-on part and the fan unit have structures to increase a size of a surface area thereof.

3. The drive of claim 2, wherein the structures are radially extending ribs.

4. The drive of claim 1, wherein the motor housing of the dynamoelectric rotational machine has an outer circumference which includes at least one section with ribs.

5. The drive of claim 1, wherein the electronic add-on part includes a component embodied as an actuator or a converter.

* * * * *